Figure 1:
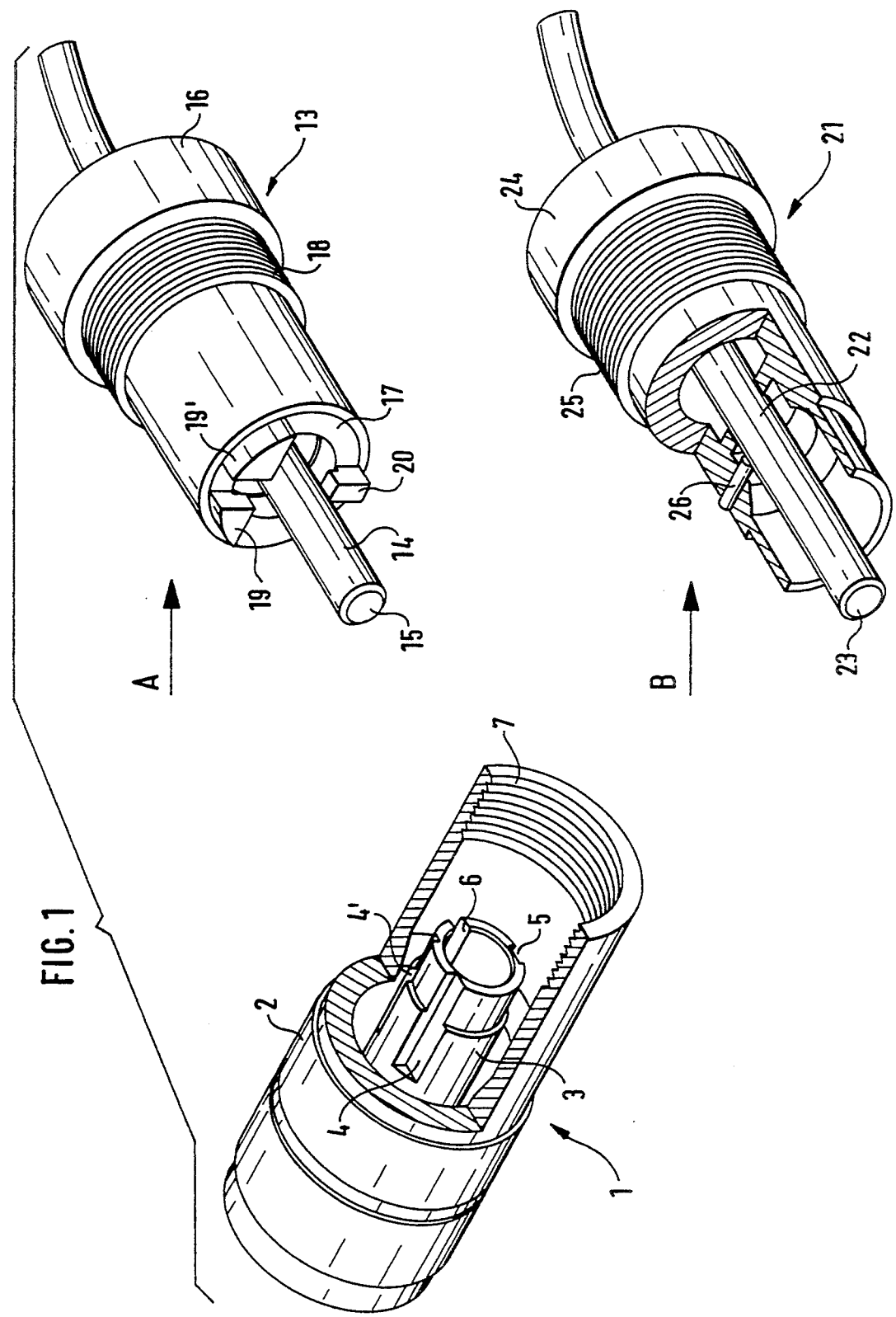

United States Patent [19]
de Marchi et al.

[11] Patent Number: 5,444,806
[45] Date of Patent: Aug. 22, 1995

[54] ADAPTOR AND PLUG PORTION FOR ATTAINMENT OF AN OPTICAL PLUG CONNECTION

[75] Inventors: Silverio de Marchi, Contra, Switzerland; Thomas Mühl, Eningen, Germany

[73] Assignees: Diamond SA, Losone, Switzerland; Wandel & Goltermann GmbH & Co., Eningen, Germany

[21] Appl. No.: 311,587

[22] Filed: Sep. 23, 1994

[30] Foreign Application Priority Data

Dec. 8, 1993 [EP] European Pat. Off. ........... 93810857

[51] Int. Cl.[6] ............ G02B 6/00; G02B 6/36
[52] U.S. Cl. ............................................ 385/75
[58] Field of Search ........................... 385/75–79, 385/81, 83, 86, 88

[56] References Cited
U.S. PATENT DOCUMENTS

| | | | |
|---|---|---|---|
| 4,081,208 | 3/1978 | Meade | 385/75 |
| 4,277,135 | 7/1981 | Schrott et al. | 385/75 |
| 4,325,606 | 4/1982 | Ikuno et al. | 385/75 X |
| 4,396,248 | 8/1983 | Bientz et al. | 385/75 |
| 5,274,722 | 12/1993 | Saitoh et al. | 385/75 X |
| 5,381,496 | 1/1995 | Morlion et al. | 385/75 |
| 5,394,496 | 2/1995 | Caldwell et al. | 385/75 X |

*Primary Examiner*—Akm E. Ullah
*Attorney, Agent, or Firm*—Shoemaker and Mattare, Ltd.

[57] ABSTRACT

An adaptor (1) can be releasably connected to a fixed plug portion (13 or 21). The fixed plug portion is, with that, for example a component in a measuring device for taking measurements on differing optical fibers. The adaptor is provided with a sleeve (3) in which various transferable plug portions can be temporarily inserted. The sleeve has an axially parallel slot (6) for accommodating a rotational security device on an initial category of fixed plug portions (21). Additionally, the sleeve also has at least one further recess (4, 4, 5) on its outer casing for accommodation of the rotational security device (19, 19', 20) of a second category of fixed plug portions (13). In this way, an interface between adaptor (1) and fixed plug portion (13, 21) is created, which indeed enables combination with an adaptor equipped in the same way, although an adaptor without an additional recess is only able to be placed on one of the two categories.

9 Claims, 4 Drawing Sheets

ADAPTOR AND PLUG PORTION FOR ATTAINMENT OF AN OPTICAL PLUG CONNECTION

The invention concerns an adaptor and/or a plug portion for attainment of an optical plug connection according to the preamble of the independent patent claims 1 or 2, respectively 3. These types of combinations of adaptors and plug portions are, for example, required on the output terminal of a measuring device used for carrying out measurements on optical fibres. The plug portion is in this case mounted firmly on the measuring device, with the adaptor being removable or exchangeable. The plug portion is easily accessible for cleaning purposes, whilst various adaptors can be connected, according to the plug type to be subjected to testing.

A problem with known combinations is that the physical contact of specific fixed and transferable plug portions within the adaptor could lead to damage of either one or the other component. Fixed plug portions are actually involved here, the plug ferrules of which are inclined on their faces in order to achieve a high return loss. These types of plug portions must not be brought into contact with transferable plug portions if the plug ferrules of said transferable plug portions possess no inclination on their faces. The repeated impingement of the fixed plug portion would with time result in wear of the inclined facing surface. As opposed to that, however, transferable plug portions with inclined faces can be brought into contact with non-inclined fixed plug portions without problems, since the inclined surface in each case is impinged upon only a few times in the event of measurement, which will not immediately lead to damage.

It is therefore a purpose of the invention to create an adaptor which can be connected to various categories of plug portions, however with a plug portion of a definite category being able to be connected only with a specifically allocated adaptor. This purpose is fulfilled with an adaptor possessing the features according to claim 1, or with a plug portion possessing the features according to claim 2. With that, the basic concept of the invention places the interface for the varying combination possibilities between the adaptor and the fixed plug portion and not, for example, in the access orifice of the adaptor. The design of the sleeve for the accommodation of the various categories of rotational security devices enables the employment of the adaptor for two different categories of fixed plug portions. Namely: for an initial category according to the state of the art with plug ferrules without inclined surfaces, and for a second category of new design with inclined plug ferrules. The fixed plug portions according to the invention are, on the other hand, designed in such a way that only those adaptors can be attached to them which at least possess the recesses corresponding to the guide elements, whilst all other adaptors, the sleeves of which possess a means of accommodating alternative rotational security devices, cannot be inserted into the plug portion.

It is a further purpose of the invention to create an adaptor and plug portion, the coordination of which will be improved with regard to stability and dimensional accuracy. This further purpose is fulfilled with an adaptor and with a plug portion possessing the features according to claim 3. The arrangement of at least two axially parallel recesses within the sleeve, with associated guide elements on the plug portion, will lead to a considerable improvement in lateral stability and to a reduction of play.

A simplification of the design can be achieved if the plug portion possesses a plug ferrule which is surrounded by the plug housing, and if the guide elements are formed in one piece with said plug housing. If the guide elements are at the same time arranged on the facing sides of the plug housing, these can be machined directly into the material of the plug housing.

A particulary optimal rotational security device and guide will be created if the sleeve possesses three recesses with, in relation to the plane of symmetry running through the axis of the sleeve, a U-shaped groove being arranged to lie in said plane of symmetry, together with L-shaped grooves lying diametrically opposed on both sides of and at a distance from said plane of symmetry. With that, a type of three-point bearing will be created, with the grooves only requiring modest depth.

Figure 2:
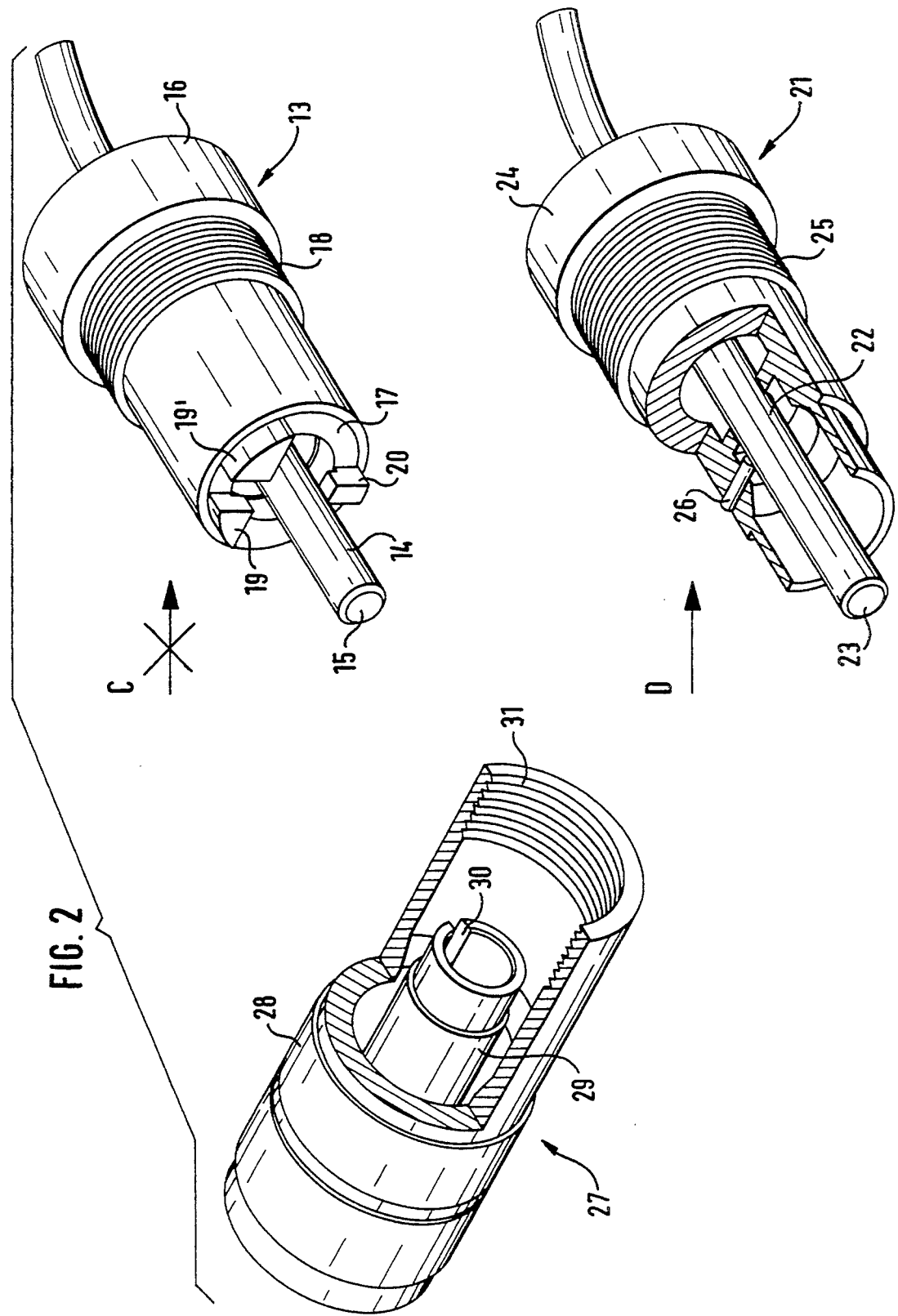
Figure 3:
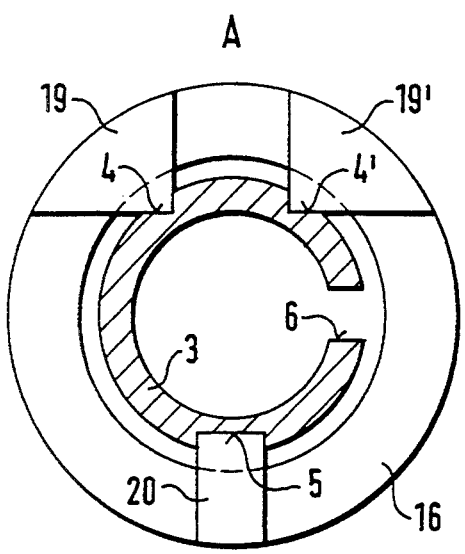
Figure 4:
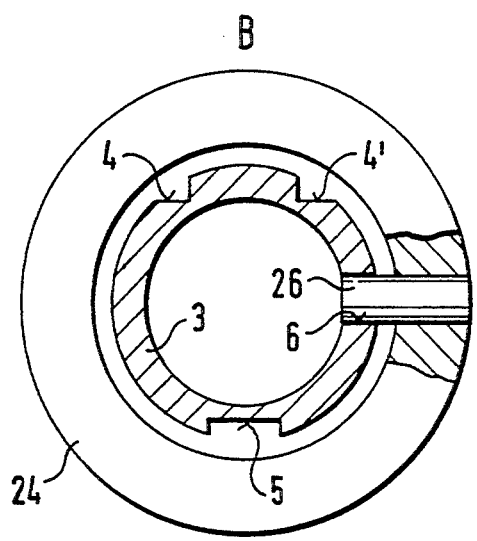
Figure 5:
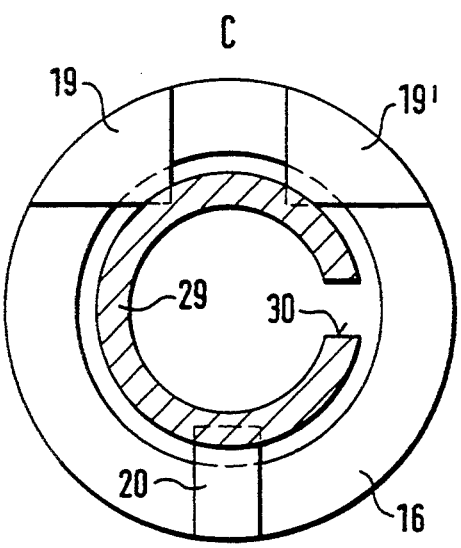
Figure 6:
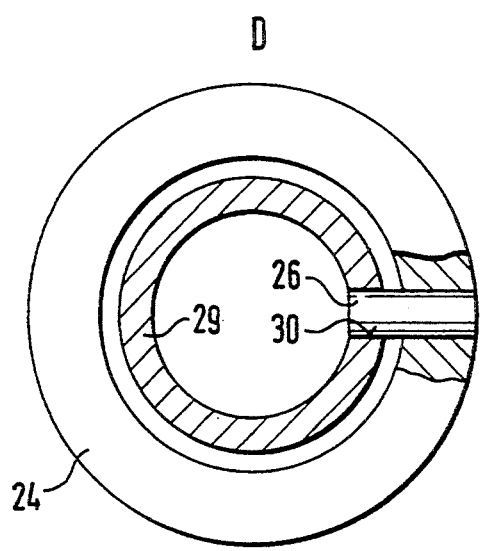
Figure 7:
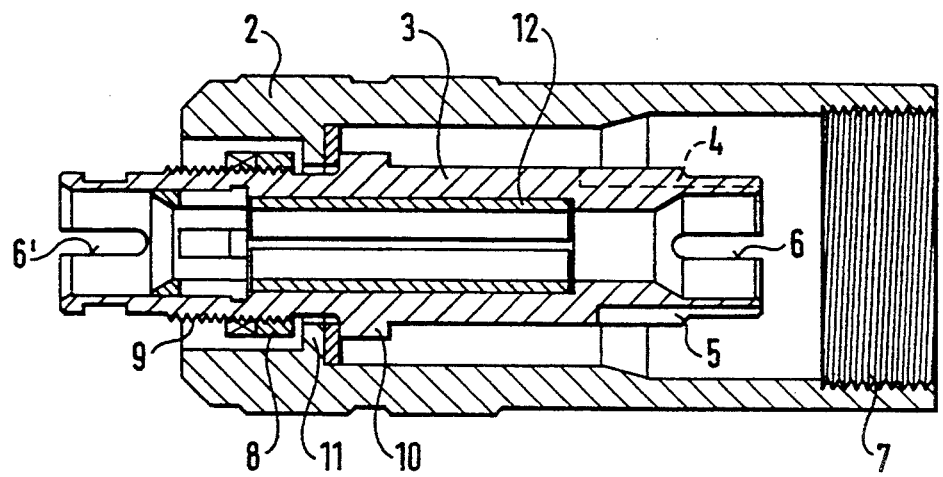
Figure 8:
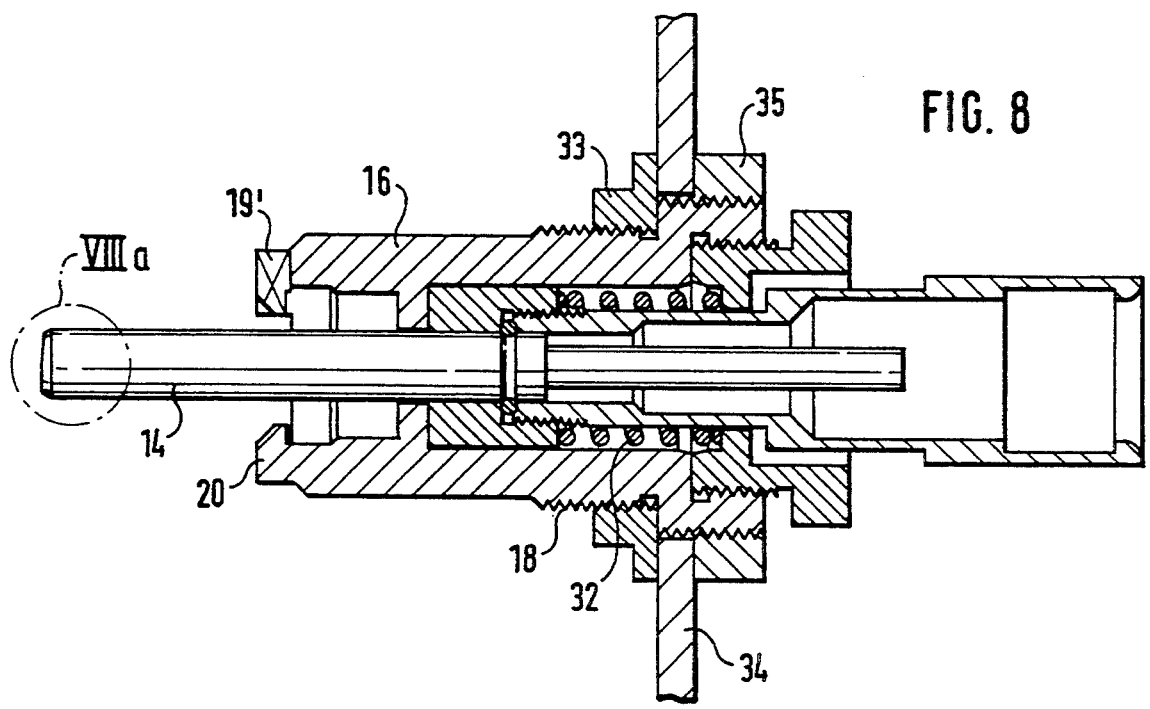
Figure 8A:
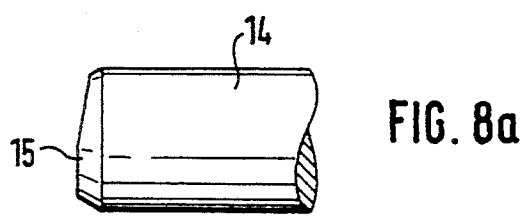

Further advantages and individual features of the invention will become apparent from the following description of an embodiment, and also from the drawings. Namely:

FIG. 1 a perspective portrayal of a new adaptor according to the invention, with in each case a plug portion according to the invention and according to the state of the art, FIG. 2 a perspective portrayal of an adaptor according to the state of the art, with a plug portion in each case according to the invention and according to the state of the art, FIGS. 3 and 4 the combinations arising from FIG. 1, FIGS. 5 and 6 the combinations arising out of FIG. 2, FIG. 7 a cross section through an adaptor according to the invention, FIG. 8 a cross section through a plug portion according to the invention, and FIG. 8a an enlargement of the tip section of a plug ferrule on the plug portion according to FIG. 8.

To the left, FIG. 1 shows an adaptor 1 according to the invention, comprising a sleeve housing 2 with a sleeve 3 held within it. On its outer casing, the sleeve possesses axially parallel recesses in the form of approximately L-shaped grooves 4, 4' and an approximately U-shaped groove 5. Additionally, however, the sleeve 3 is also provided with an axially parallel slot 6 which extends along only a part of the length of the recesses 4, 4' and 5. An inside thread 7 is arranged on one end of the end-housing of the sleeve 2. Since the sleeve 3 is held to be able to rotate in the sleeve housing 2, said sleeve housing can be employed as a threaded ring-fastener for releasable attachment of the adaptor 1 to a plug portion in which a plug ferrule 14 is held.

Above and to the right, FIG. 1 shows a plug portion 13 according to the invention with a plug housing 16 in which a plug ferrule 14 is held. The face 15 of this plug ferrule has, for example, an inclination which will be more exactly described in the following. Guide elements are arranged on the face 17 of the plug housing 16, said guide elements coordinating with recesses in the sleeve 3 and forming a rotational security device. The guide elements comprise two circular sections 19 and 19' and a lug 20 lying diametrically opposite a point between said circular sections. An outside thread 18 is arranged on the rear part of the plug housing 16, said thread fitting the inside thread 7 of the adaptor 1.

To the right and below, FIG. 1 shows a plug portion 21 according to the state of the art, with a plug housing 24, and with a plug ferrule 22, the face 23 of which is not inclined, being held within said plug housing 24. An adaptor can likewise be screwed onto an outside thread 25. A pin 26 inserted through the housing wall, transverse to the plug axis, serves as a rotational security device, said pin coordinating with the slot 6 in the sleeve 3.

The combinations between the adaptor 1 and the plug portions 13 or 21 are identified as A and B. Both combinations are possible, in other words in both cases the adaptor 1 can be screwed onto the plug portion, with the plug ferrule 14 or 22 in each case being inserted into the sleeve 3 to assume the correct position.

To the left, FIG. 2 shows an adaptor 27 according to the state of the art. It likewise possesses a sleeve housing which is similar or identical to the sleeve housing 2 according to FIG. 1. Accordingly, an inside thread 31 is also provided. The sleeve 29, however, held to be able to rotate within the sleeve housing 28, only possesses an axially parallel slot 30.

The plug portions 13 and 21 shown to the right in FIG. 2 are absolutely identical to those shown in FIG. 1. The combinations arising out of FIG. 2 are identified a C and D, with only the combination D being possible, however. This combination corresponds to the known state of the art. In contrast, the combination C, thus an adaptor 27 according to the state of the art with the plug portion 13 according to the invention, is not possible since no recesses corresponding to the guide elements 19, 19' and 20 exist on the sleeve 29. Although transferable plugs of varying construction can be inserted into the adaptor 27, non-permitted plug pairings are nevertheless not possible because the adaptor 27 cannot be connected to the new plug portion 13.

In the FIGS. 3 to 6, the combinations A, B, C and D are shown again in cross section. FIG. 3 shows the combination A between the adaptor according to the invention and plug portion. From this figure it can also be seen not only how the U-shaped groove 5 but also the lug 20 lie on a plane of symmetry running through the sleeve axis. The two L-shaped grooves 4 and 4', respectively the two circular sections 19 and 19' are arranged diametrically opposed and displaced to both sides of this plane of symmetry. The completely cut-through slot 6 fulfills absolutely no function in the case of combination A.

In contrast, from FIG. 4 it can be seen how, in the case of combination B, the pin 26 of a known category of plug portions enters the slot 6 and in this way causes correct positioning between the sleeve and plug ferrule. In place of a completely cut-through slot, naturally merely an axially parallel groove could be arranged in the same way. In each case, however, the length of the pin 26 must be dimensioned in such a way that this cannot be introduced into the U-shaped groove 5.

FIG. 5 shows the impossible combination C, with which the adaptor 27 cannot be screwed onto the plug portion 13. This is prevented by the guide elements 19, 19' and 20.

The combination D, according to the state of the art, has merely been shown for reasons of completeness, once again the pin 26 being inserted into the slot 30 of the sleeve 29, said sleeve otherwise possessing no further recesses.

FIG. 7 more exactly shows the construction of the adaptor 1 according to the invention. The sleeve housing 2 is provided with a shoulder 11 running around its inside, on which the sleeve 3 can be attached. For this purpose, the sleeve has a surrounding flange 10 and a threaded section 9. With the aid of a threaded ring-fastener 8, which can be glued when screwing-on, the sleeve 3 can be held to be able to rotate in the sleeve housing 2. With its light spring tension, a slotted inner sleeve 12 ensures that the plug ferrules introduced from both sides into the sleeve are held absolutely concentrically and with an exact fit. The end of the sleeve protruding out of the sleeve housing 2 is likewise provided with an axially parallel slot 6'. By this means it is ensured that each transferable plug inserted into each adaptor can only be inserted in a specific angular configuration.

FIG. 8 shows the fixed plug portion 13 which can, for example, be attached to the housing wall 34 of a measuring device. For this purpose, threaded ring-fasteners 33 and 35 can be screwed-on, the threaded ring-fastener 33 sitting on the same outside thread 18 as the sleeve housing 2 of the screw-on adaptor. The plug ferrule 14 is held with axial spring action within the plug housing 16, the pressure spring 32 producing the required spring force.

FIG. 8a shows how the face 15 of the plug ferrule 14 is inclined at an angle of, for example, 8 degrees. This corresponds to a radius R of for example 2.5 mm. The optical fibre held to be centred in the plug ferrule will likewise be subjected to inclination, which in a known way will lead to a high return loss. Naturally, the rotational position of the plug ferrule in relation to the plug housing 16 is likewise set and fixed, so that the inclination will constantly assume the same position in the sleeve 3.

With the precondition that the known connector portions 21 according to FIGS. 1 and 2 are equipped with plug ferrules 22 without inclination, a transferable plug portion without inclination can never come up against a fixed plug portion with inclination. This would be prevented by the combination C according to FIG. 5, in that the corresponding adaptor could not be screwed onto the plug portion. Fixed plug portions with inclination can be paired exclusively with transferable plug portions with inclination, whilst fixed plug portions without inclination, however, can be paired equally well with plug portions with or without inclination.

Inasmuch as the invention is subject to modifications and variations, the foregoing description and accompanying drawings should not be regarded as limiting the invention, which is defined by the following claims and various combinations thereof:

We claim:

1. Adaptor (1) for the attainment of an optical plug connection between a firmly mounted, fixed plug portion and a freely mobile, transferable plug portion, the adaptor possessing a sleeve (3) surrounded by a sleeve housing (2), said sleeve possessing an axially parallel slot (6) or an axially parallel groove for the accommodation of a rotational security device on an initial category of fixed plug portion (21) and, further, the sleeve housing (2) being able to be connected releasably with the fixed plug portion (21), characterized in that the sleeve (3) possesses on its outer casing at least one further axially parallel recess (4, 4', 5) for exactly fitting accommodation of a rotational security device on a second category of fixed plug portion (13), the adaptor being selectably able to be connected with the fixed plug portion of the initial or second category.

2. Firmly mounted, fixed plug portion (13) for the attainment of an optical plug connection with a freely mobile, transferable plug portion with the employment of an adaptor (1), said adaptor possessing a sleeve (3) surrounded by a sleeve housing (2), the sleeve housing being able to be connected releasably with the fixed plug portion (13) and the sleeve coordinating with a rotational security device on the fixed plug portion, characterized in that the fixed plug portion (13) possesses a plug ferrule (14) held within a plug housing (16) and that the rotational security device possesses at least two guide elements (19, 19', 20) which are arranged with irregular angular spacing on the plug housing and which are oriented towards the plug ferrule, said guide elements engaging in corresponding recesses (4, 4', 5) on the outer casing of the sleeve (3).

3. Adaptor (1) and plug portion (13) for the attainment of an optical plug connection with a further plug portion which is able to be inserted into the adaptor, the adaptor being connected releasably with the plug portion and the plug portion possessing a rotational security device, said rotational security device coordinating with a sleeve (3) on the adaptor (1) and permitting a connection between plug portion (13) and sleeve (3) only in the case of correct positioning, characterized in that at least two axially parallel recesses (4, 4',5) are arranged with irregular angular spacing on the outer casing of the sleeve (3), said recesses coordinating with two corresponding guide elements (19, 19', 20) on the plug portion (13).

4. Adaptor (1) and plug portion (13) according to claim 3, characterized in that the plug portion (13) possesses a plug ferrule (14) which is surrounded by the plug housing (16) and that the guide elements are connected as one piece to the plug housing.

5. Adaptor (1) and plug portion (13) according to claim 4, characterized in that the guide elements are arranged on the face (17) of the plug housing (16).

6. Adaptor (1) and plug portion (13) according to claim 3, characterized in that the sleeve (3) possesses three recesses (4, 4', 5) with, in relation to a plane of symmetry passing through the axis of the sleeve, a U-shaped groove (5) being arranged to lie in said plane of symmetry and, diametrically opposite, two L-shaped grooves (4, 4') being arranged to lie at a distance to and on both sides of said plane of symmetry.

7. Adaptor (1) and plug portion (13) according to claim 6, characterized in that the guide elements on the plug portion (13) are shaped as two circular sections (19, 19') to fit the L-shaped grooves and a lug (20) to fit the U-shaped groove.

8. Adaptor (1) and plug portion (13) according to claim 3, characterized in that the sleeve (3) possesses an axially parallel slot (6) in addition to the recesses (4, 4', 5), so that the adaptor (1) is also able to be connected with a plug portion (21) of another category, the rotational security device of which coordinates exclusively with the slot (6).

9. Adaptor (1) and plug portion (13) according to claim 3, characterized in that the plug portion (13) possesses a plug ferrule (14), the face (15) of which is equipped with an inclination for achievement of high return loss at the outlet of the optical fibre.

* * * * *